Sept. 21, 1926.
J. W. CARR
1,600,534
LATHE CENTER
Original Filed Nov. 6, 1924
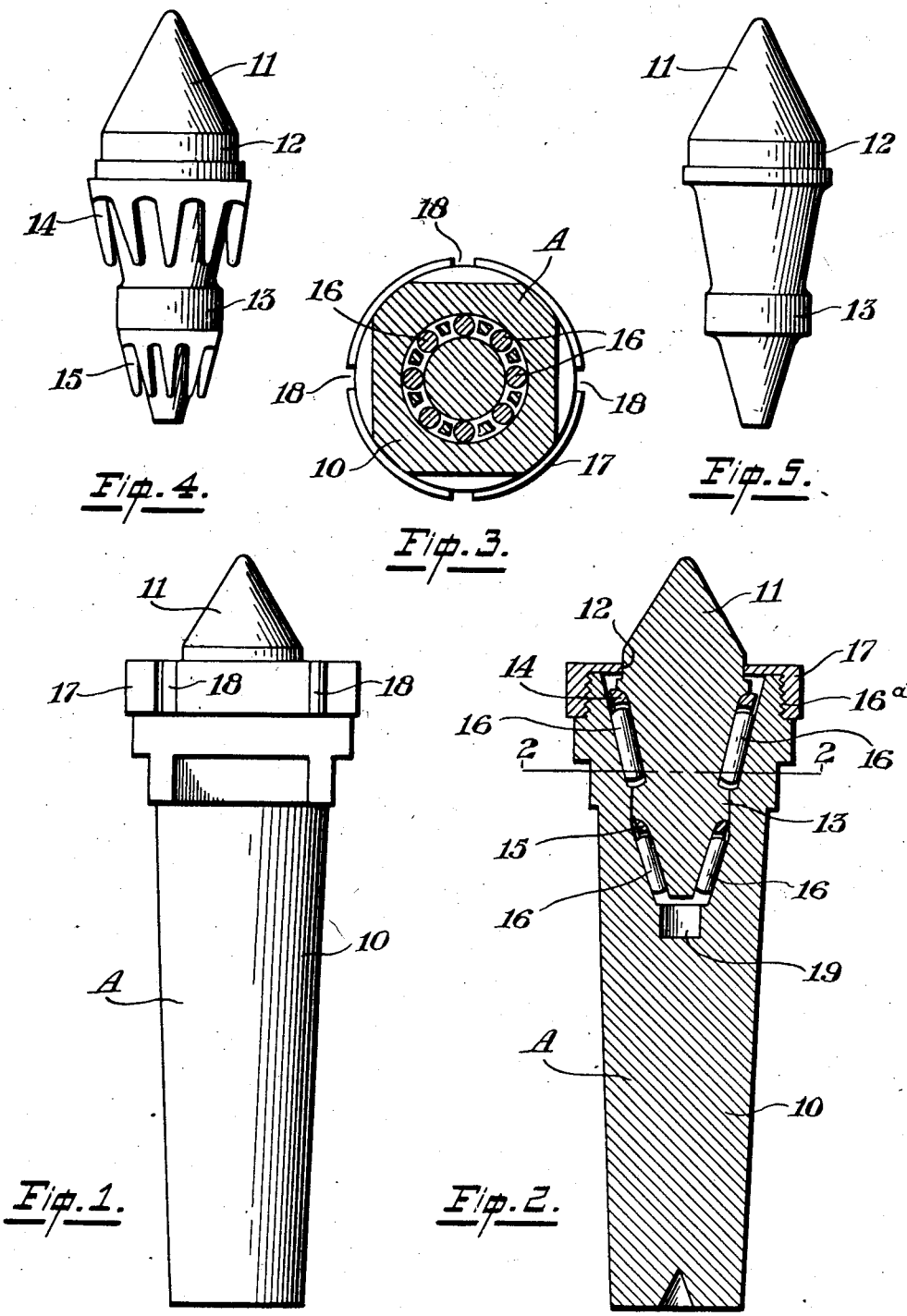
INVENTOR.
JOHN. W. CARR.
BY Fetherstonhaugh & Co.
ATT'YS.

Patented Sept. 21, 1926.

1,600,534

UNITED STATES PATENT OFFICE.

JOHN WESLEY CARR, OF AMHERST, NOVA SCOTIA, CANADA.

LATHE CENTER.

Application filed November 6, 1924, Serial No. 748,176, and in Canada September 17, 1924.

This invention relates to improvements in lathe centers, and the objects of the invention are to provide a device of simple and inexpensive construction that will be interchangeable and constructed of one solid piece.

Further objects are to provide an attachment of this description formed with an interchangeable center of simple and durable construction and in which the several parts are designed to reduce friction and resistance to a minimum and to take up wear due to continued use.

A still further object is to provide a lathe center in which no adjustment is needed as the angles on it are so formed as to wear equally.

With the foregoing and other objects in view, the invention consists essentially in the improved center for lathe and milling machines, an example of which is described in the present specification and illustrated by the accompanying drawings that form part of the same.

Referring now to the drawings in which like characters of reference indicate corresponding parts in each figure:

Figure 1 is a plan view.

Figure 2 is a longitudinal section.

Figure 3 is a section on line 2—2 of Figure 2.

Figure 4 is a plan of male member with roller-retaining cages.

Figure 5 is a plan view of the male member.

In the drawings, A designates the example of the device or center as a whole and comprising, as here shown, a casing or sleeve 10 in which is designed to fit the male or engaging member 11. This member is formed with rim projections 12 and 13 and bearing thereon are the forked carrying members 14 and 15 adapted to receive the roller bearings 16 thereon. The top of the casing 10 is screw threaded at 16ª to engage with a threaded cap 17 adapted to fit thereon and through an orifice in which the point of the member 11 protrudes. To adjust or remove the cap grooves 18 are formed therein.

I also provide on the member 10 at the base of the engaging member or center 11 a recess or well 19 designed to hold oil or the like for lubricating purposes.

From the foregoing it will be seen that my improved center is interchangeable as well as adjustable, a combination of essential features not heretofore used.

To change the center, unscrew the cap 17 and remove members, 11, 14, 15 and 16, replacing them when necessary by a center adapted for a different purpose.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:—

A lathe center of the character described comprising, a male member tapered at both ends and formed intermediate thereof and in spaced relationship to one another, bearing rings, forked roller bearing carrying members on the center and adapted to bear against the rings, an inwardly tapered casing formed with a recess or chamber therein adapted to engage with said male member and an adjustable cap for the casing adapted to engage with the male member.

In witness whereof I have hereunto set my hand.

JOHN WESLEY CARR.